US012689643B2

(12) United States Patent
Paul et al.

(10) Patent No.: US 12,689,643 B2
(45) Date of Patent: Jul. 21, 2026

(54) SYSTEMS AND METHODS FOR ANOMALY DETECTION BASED ON ENDPOINT AND NETWORK TRAFFIC PROFILES

(71) Applicant: Zscaler, Inc., San Jose, CA (US)

(72) Inventors: Sandeep Paul, Bengaluru (IN);
Atinderpal Singh, Burnaby (CA);
Zicun Cong, Burnaby (CA); Deepen Desai, San Ramon, CA (US)

(73) Assignee: Zscaler, Inc., San Jose, CA (US)

( * ) Notice: Subject to any disclaimer, the term of this patent is extended or adjusted under 35 U.S.C. 154(b) by 92 days.

(21) Appl. No.: 18/742,109

(22) Filed: Jun. 13, 2024

(65) Prior Publication Data

US 2025/0330479 A1     Oct. 23, 2025

(30) Foreign Application Priority Data

Apr. 18, 2024     (IN) .............................. 202441031104

(51) Int. Cl.
*H04L 9/40*                (2022.01)

(52) U.S. Cl.
CPC .......... H04L 63/1425 (2013.01); H04L 63/02 (2013.01); H04L 63/1441 (2013.01)

(58) Field of Classification Search
CPC .. H04L 63/1425; H04L 63/02; H04L 63/1441
See application file for complete search history.

(56) References Cited

U.S. PATENT DOCUMENTS

| | | | | |
|---|---|---|---|---|
| 11,411,958 | B2 * | 8/2022 | Pularikkal | ........... H04L 63/1425 |
| 2017/0078314 | A1 * | 3/2017 | Mohanty | ............. H04L 63/1425 |
| 2017/0329783 | A1 * | 11/2017 | Singh | .................. H04L 63/1441 |
| 2018/0219895 | A1 * | 8/2018 | Silver | ................. H04L 63/1425 |
| 2019/0007429 | A1 * | 1/2019 | Erinle | ................. H04L 63/1416 |
| 2019/0222597 | A1 * | 7/2019 | Crabtree | ............. H04L 63/1425 |
| 2021/0218764 | A1 * | 7/2021 | Lowney | ............. H04L 63/1441 |
| 2021/0349994 | A1 * | 11/2021 | Ravindra | ............. G06F 21/554 |
| 2021/0377288 | A1 * | 12/2021 | Chen Kaidi | ........ H04L 63/1416 |
| 2023/0353587 | A1 | 11/2023 | Bui et al. | |
| 2024/0028707 | A1 | 1/2024 | Paul et al. | |
| 2024/0265099 | A1 * | 8/2024 | Noeth | ................ H04L 63/0263 |

OTHER PUBLICATIONS

Rose et al., "Intrusion Detection using Network Traffic Profiling and Machine Learning for IoT," 2021 IEEE 7th International Conference on Network Softwarization (NetSoft) Year: 2021 | Conference Paper | Publisher: IEEE.*

Gill et al., "Profiling Network Traffic Behavior for the Purpose of Anomaly-Based Intrusion Detection," 2018 17th IEEE International Conference on Trust, Security and Privacy in Computing and Communications/ 12th IEEE International Conference on Big Data Science and Engineering (TrustCom/BigDataSE)Year: 2018 |.*

* cited by examiner

*Primary Examiner* — Roderick Tolentino
(74) *Attorney, Agent, or Firm* — Baratta Law PLLC; Lawrence A. Baratta, Jr.; Ryan Odessa

(57)          ABSTRACT

Systems and methods for anomaly detection based on endpoint and network traffic profiles include performing inline monitoring of traffic within a network of a plurality of networks via a cloud; identifying anomalous traffic within the traffic based on a network profile, wherein the network profile defines baseline network traffic parameters for the network; determining if one or more other networks of the plurality of networks exhibit traffic similar to the anomalous traffic; and performing an action based on the determining.

20 Claims, 12 Drawing Sheets

600

SYSTEMS AND METHODS FOR ANOMALY DETECTION BASED ON ENDPOINT AND NETWORK TRAFFIC PROFILES

FIELD OF THE DISCLOSURE

The present disclosure generally relates to network and cloud security. More particularly, the present disclosure relates to systems and methods for anomaly detection based on endpoint and network traffic profiles.

BACKGROUND OF THE DISCLOSURE

As networks evolve, ensuring their security and stability becomes crucial. Anomalous network traffic, such as unexpected spikes, unusual patterns, or suspicious behavior poses a significant challenge when early detection is key. Detecting and mitigating these anomalies are essential to maintaining network integrity. The real challenge posed by sophisticated attacks is that they can stay undetected in their environment. This can be damaging as the longer an attack holds, the higher the likelihood of damage is introduced. Conventional approaches such as IP blocklists, domain blocklists, and the like are reactive in nature and do not offer real time security when new attacks, sophisticated/large attacks, and attacks that are in a developmental phase are encountered. The present disclosure provides solutions to these problems by introducing systems and methods for narrowing the gap between infection and detection. When anomalous traffic is detected based on various endpoint and network traffic profiles, the present systems can quickly identify if the traffic is malicious or abnormal in nature, thereby mitigating an infection becoming undetected.

BRIEF SUMMARY OF THE DISCLOSURE

The present disclosure relates to systems and methods for anomaly detection based on endpoint and network traffic profiles. In various embodiments, the present disclosure includes a method having steps, a processing device configured to implement the steps, a cloud-based system configured to implement the steps, and as a non-transitory computer-readable medium storing instructions for programming one or more processors to execute the steps. The steps include performing inline monitoring of traffic within a network of a plurality of networks via a cloud; identifying anomalous traffic within the traffic based on a network profile, wherein the network profile defines baseline network traffic parameters for the network; determining if one or more other networks of the plurality of networks exhibit traffic similar to the anomalous traffic; performing an action based on the determining.

The steps can further include allowing the traffic, blocking the traffic, and alerting a user of the network. The identifying can be performed by an analyzer associated with the network, wherein the determining is performed by the cloud. The steps can further include responsive to the analyzer identifying anomalous traffic within the network, receiving an alert for the anomalous traffic; responsive to receiving the alert, determining if the one or more other networks of the plurality of networks exhibit traffic similar to the anomalous traffic. The alert can include one or more parameters associated with the anomalous traffic. The network profile can include parameters defining baseline characteristics of the network as well as hosts within the network, wherein identifying anomalous traffic includes detecting parameters within the traffic which fall outside of the baseline characteristics of the network. The determining can include determining that one or more other networks of the plurality of networks exhibit traffic similar to the anomalous traffic, wherein the action includes allowing the traffic based thereon. The one or more other networks of the plurality of networks can belong to any of a same customer associated with the network and one or more different customers. The steps can further include updating the network profile based on determining that one or more other networks of the plurality of networks exhibit traffic similar to the anomalous traffic. The determining can include determining that one or more other networks of the plurality of networks do not exhibit traffic similar to the anomalous traffic, wherein the steps further include performing an inspection of the anomalous traffic to determine if the anomalous traffic is malicious or legitimate.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for anomaly detection based on traffic from endpoints and networks. In various embodiments, the cloud is adapted to monitor user traffic, network traffic, etc. inline. A plurality of networks can be associated with a single customer of the cloud, or separate customers of the cloud. As described, the systems are adapted to create network profiles and/or endpoint profiles based on observing traffic originating from various networks, each having endpoints executing thereon. That is, the systems are adapted to create a network profile for each network associated with the cloud, and, in various embodiments, an endpoint profile for each endpoint of the networks. The systems are adapted to identify anomalous traffic based on these profiles and investigate other networks to determine if any other networks or endpoints exhibit such traffic. Because the cloud has visibility into a plurality of networks, the present systems can make more accurate determinations as to whether anomalous traffic exhibited by a network is malicious or not.

§ 1.0 Cybersecurity Monitoring and Protection
Examples

Figure 1A:
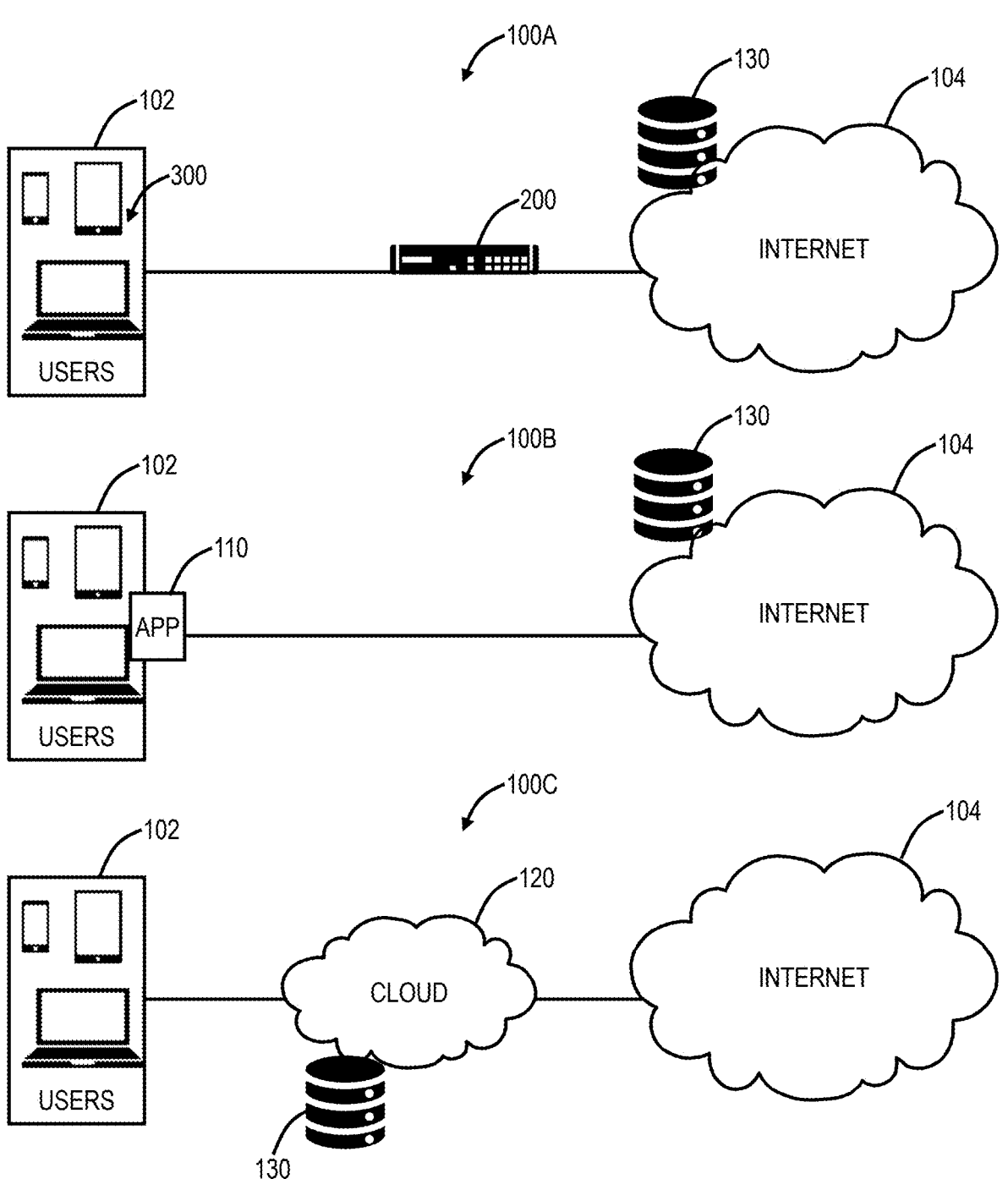
FIG. 1A is a network diagram of three example network configurations of cybersecurity monitoring and protection of a user.
Figure 2:
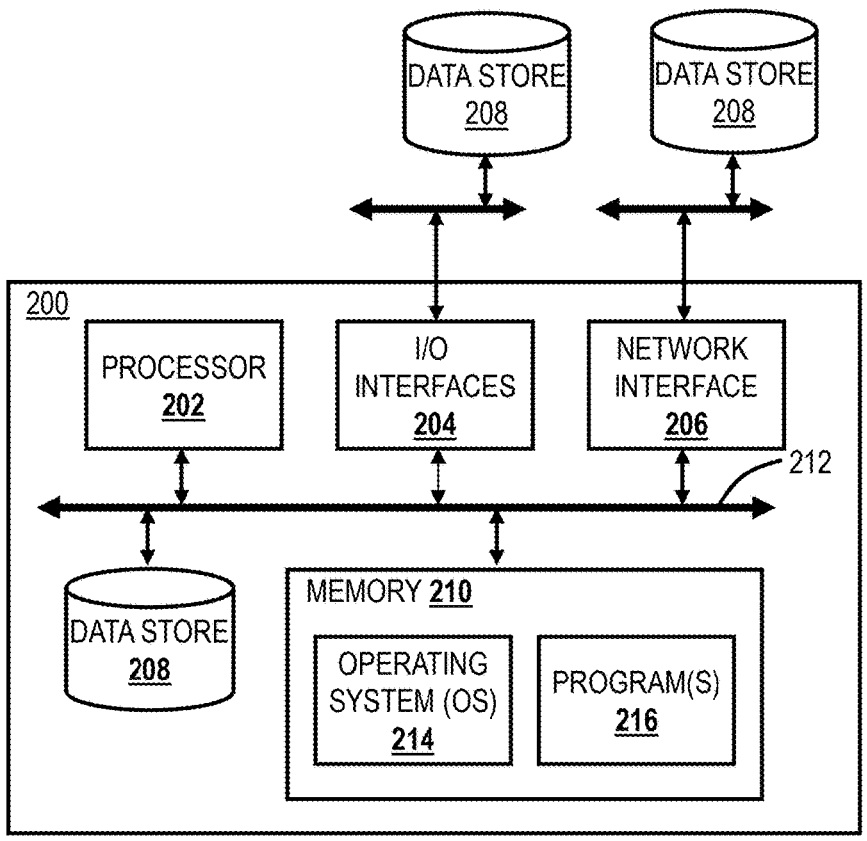
FIG. 2 is a block diagram of a server.

FIG. 1A is a network diagram of three example network configurations 100A, 100B, 100C of cybersecurity monitoring and protection of an endpoint 102. Those skilled in the art will recognize these are some examples for illustration purposes, there may be other approaches to cybersecurity monitoring (as well as providing generalized services), and these various approaches can be used in combination with one another as well as individually. Also, while shown for a single endpoint 102, practical embodiments will handle a large volume of endpoints 102, including multi-tenancy. In this example, the endpoint 102 communicates on the Internet 104, including accessing cloud services, Software-as-a-Service, etc. (each may be offered via computing resources, such as, e.g., using one or more servers 200 as illustrated in FIG. 2).

Note, the term endpoint 102 is used herein to refer to any computing device (see FIG. 3 for an example computing device 300) which can communicate on a network. The endpoint 102 can be associated with a user and include laptops, tablets, mobile phones, desktops, etc. Further, the endpoint can also mean machines, workloads, IoT devices, or simply anything associated with the company that connects to the Internet, a Local Area Network (LAN), etc.

As part of offering cybersecurity through these example network configurations 100A, 100B, 100C, there is a large amount of cybersecurity data obtained. Various embodiments of the present disclosure focus on using this cybersecurity data along with a customer's data to perform various security tasks including developing customer machine learning models and other security platforms of the like.

The network configuration 100A includes a server 200 located between the endpoint 102 and the Internet 104. For example, the server 200 can be a proxy, a gateway, a Secure Web Gateway (SWG), Secure Internet and Web Gateway, Secure Access Service Edge (SASE), Secure Service Edge (SSE), Cloud Application Security Broker (CASB), etc. The server 200 is illustrated located inline with the endpoint 102 and configured to monitor the endpoint 102. In other embodiments, the server 200 does not have to be inline. For example, the server 200 can monitor requests from the endpoint 102 and responses to the endpoint 102 for one or more security purposes, as well as allow, block, warn, and log such requests and responses. The server 200 can be on a local network associated with the endpoint 102 as well as external, such as on the Internet 104. Also, while described as a server 200, this can also be a router, switch, appliance, virtual machine, etc. The network configuration 100B includes an application 110 that is executed on the computing device 300. The application 110 can perform similar functionality as the server 200, as well as coordinated functionality with the server 200 (a combination of the network configurations 100A, 100B). Finally, the network configuration 100C includes a cloud service 120 configured to monitor the endpoint 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the endpoints 102, using signatures sourced and constantly updated. The DNS security can identify and route command-and-control connections to threat detection engines for full content inspection. The DLP can use standard and/or custom dictionaries to continuously monitor the endpoints 102, including compressed and/or Transport Layer Security (TLS) or Secure Sockets Layer (SSL)-encrypted traffic.

In typical embodiments, the network configurations 100A, 100B, 100C can be multi-tenant and can service a large volume of the endpoints 102. Newly discovered threats can be promulgated for all tenants practically instantaneously. The endpoints 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of endpoints 102 under management by an IT group, department, administrator, etc., i.e., some group of endpoints 102 that are managed together. One advantage of multi-tenancy is the visibility of cybersecurity threats across a large number of endpoints 102, across many different organizations, across the globe, etc. This provides a large volume of data to analyze, use machine learning techniques on, develop comparisons, etc. The present disclosure can use the term "service provider" to denote an entity providing the cybersecurity monitoring and a "customer" as a company (or any other grouping of endpoints 102).

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own endpoints 102 and configuration, policy, rules, etc.

§ 1.1 Cloud Monitoring

The cloud 120 can scale cybersecurity monitoring and protection with near-zero latency on the endpoints 102. Also, the cloud 120 in the network configuration 100C can be used with or without the application 110 in the network configuration 100B and the server 200 in the network configuration 100A. Logically, the cloud 120 can be viewed as an overlay network between endpoints 102 and the Internet 104 (and cloud services, SaaS, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the endpoints 102, as well as independent of platform, operating system, network access technique, network access provider, etc.

There are various techniques to forward traffic between the endpoints 102 and the cloud 120. A key aspect of the cloud 120 (as well as the other network configurations 100A, 100B) is that all traffic between the endpoints 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide access control, threat prevention, and data protection. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated.

§ 1.2 Zero Trust

Figure 1B:
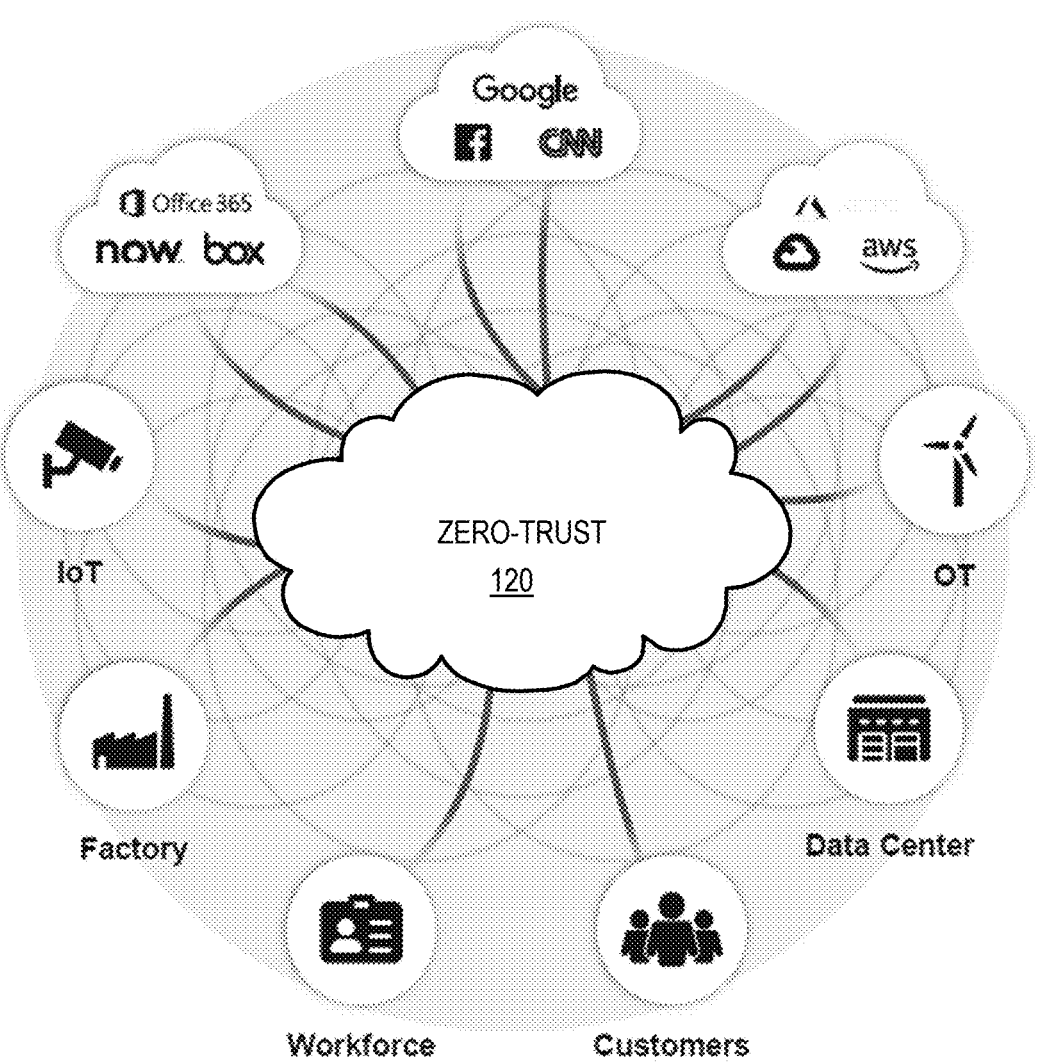
FIG. 1B is a logical diagram of the cloud operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120. Zero trust is a cybersecurity strategy where security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multi-factor authentication (MFA) approaches beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

§ 1.3 Log Data

With the cloud 120 as well as any of the network configurations 100A, 100B, 100C, the log data 130 can include a rich set of statistics, logs, history, audit trails, and the like related to various endpoint 102 transactions. Generally, this rich set of data can represent activity by an endpoint 102. This information can be for multiple endpoints 102 of a company, organization, etc., and analyzing this data can provide a wealth of information as well as training data for machine learning models.

The log data 130 can include a large quantity of records used in a backend data store for queries. A record can be a collection of tens of thousands of counters. A counter can be a tuple of an identifier (ID) and value. As described herein, a counter represents some monitored data associated with cybersecurity monitoring. Of note, the log data can be referred to as sparsely populated, namely a large number of counters that are sparsely populated (e.g., tens of thousands of counters or more, and possible orders of magnitude or more of which are empty). For example, a record can be stored every time period (e.g., an hour or any other time interval). There can be millions of active endpoints 102 or more. Examples of the sparsely populated log data can be the Nanolog system from Zscaler, Inc., the applicant.

Also, such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

A key aspect here is that the cybersecurity monitoring is rich and provides a wealth of information to determine various assessments of cybersecurity. In some embodiments, the log data 130 can be referred to as weblogs or the like. Of note, with various cybersecurity monitoring techniques via the network configurations 100A, 100B, 100C, as well as with other network configurations, the log data 130 is a rich repository of endpoint 102 activity. Unlike websites, specific cloud services, application providers, etc., cybersecurity monitoring can log almost all of an endpoint's 102 activity. That is, the log data 130 is not merely confined to specific activity (e.g., an endpoint's 102 social networking activity on a specific site, an endpoint's 102 search requests on a specific search engine, etc.).

§ 2.0 Example Server Architecture

FIG. 2 is a block diagram of a server 200, which may be used as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize the cloud 120 ultimately runs on one or more physical servers 200, virtual machines, etc.

§ 3.0 Example Computing Device Architecture

Figure 3:
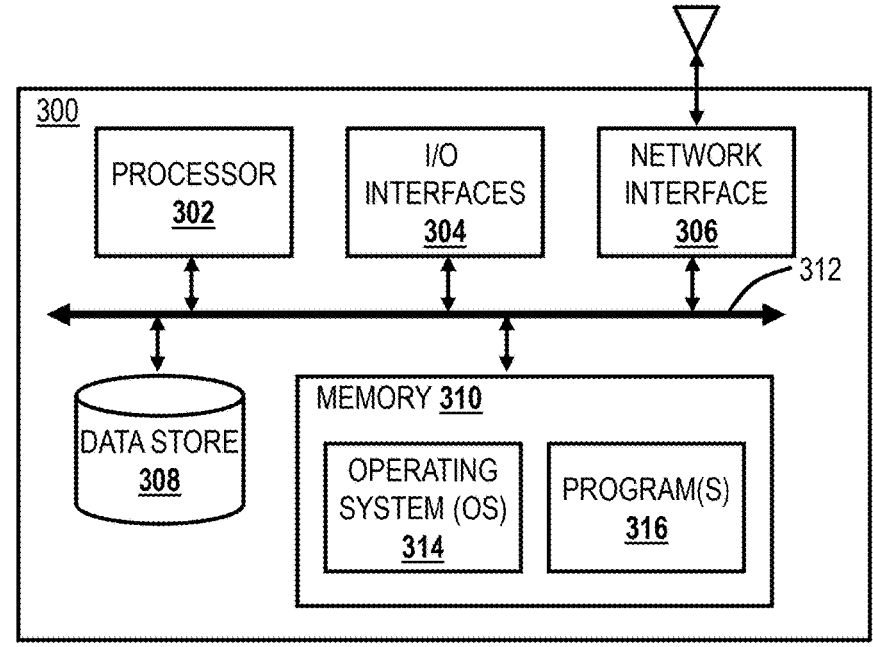
FIG. 3 is a block diagram of a computing device.

FIG. 3 is a block diagram of a computing device 300, which may be realized as an endpoint 102. Specifically, the computing device 300 can form a device used by one of the endpoints 102, and this may include common devices such as laptops, smartphones, tablets, netbooks, personal digital assistants, cell phones, e-book readers, Internet-of-Things (IoT) devices, servers, desktops, printers, televisions, streaming media devices, storage devices, and the like, i.e., anything that can communicate on a network. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the computing device 300. For example, example programs 316 may include, but not limited to, a web browser, social networking applications, streaming media applications, games, mapping and location applications, electronic mail applications, financial applications, and the like. The application 110 can be one of the example programs.

§ 4.0 Application for Traffic Forwarding and Monitoring

Again, the network configuration 100B includes an application 110 that is executed on the computing device 300. The application 110 can perform similar functionality as the server 200, as well as coordinated functionality with the server 200 (a combination of the network configurations 100A, 100B). Of course, various embodiments are contemplated herein, including combinations of the network configurations 100A, 100B, 100C together. For example, the application 110 can perform similar functionality as the cloud 120, as well as coordinated functionality with the cloud 120.

Figure 4:
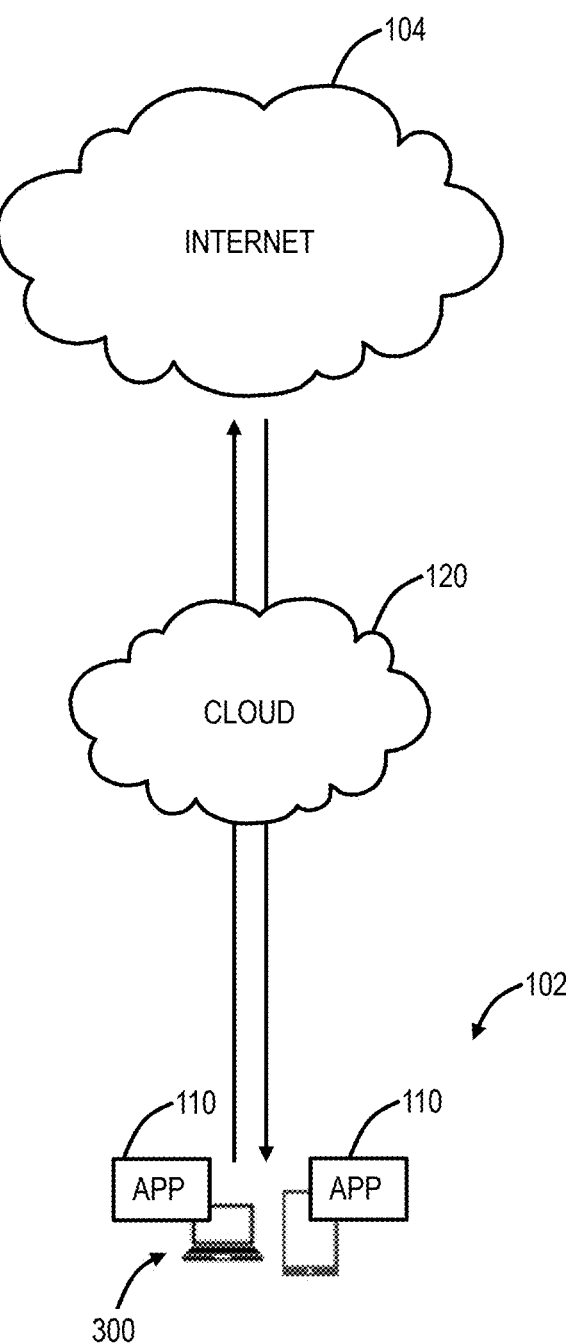
FIG. 4 is a diagram of an exemplary network configuration illustrating an application on computing devices configured to operate through the cloud.

FIG. 4 is a network diagram of an exemplary network configuration illustrating an application 110 on computing devices 300 configured to operate through the cloud 120. Different types of computing devices 300 are proliferating, including Bring Your Own Device (BYOD) as well as IT-managed devices. The conventional approach for a computing device 300 to operate with the cloud 120 as well as for accessing enterprise resources includes complex policies, VPNs, poor user experience, etc. The application 110 can automatically forward user traffic with the cloud 120 as well as ensuring that security and access policies are enforced, regardless of device, location, operating system, or application. The application 110 automatically determines if a user associated with an endpoint 102 is looking to access the open Internet 104, a SaaS app, or an internal app running in public, private, or the datacenter and routes mobile traffic through the cloud 120. The application 110 can support various cloud services, including ZIA, ZPA, ZDX, etc., allowing the best in class security with zero trust access to internal applications. As described herein, the application 110 can also be referred to as a connector application.

The application 110 is configured to auto-route traffic for seamless user experience. This can be protocol as well as application-specific, and the application 110 can route traffic with a nearest or best fit node of the cloud 120. Further, the application 110 can detect trusted networks, allowed applications, etc. and support secure network access. The application 110 can also support the enrollment of the computing device 300 prior to accessing applications, the internet, or any services provided by the cloud 120. The application 110 can uniquely detect the users based on fingerprinting the user device 300, using criteria like device model, platform, operating system, device posture, etc. The application 110 can support Mobile Device Management (MDM) functions, allowing IT personnel to deploy and manage the computing devices 300 seamlessly. This can also include the automatic installation of client and SSL certificates during enrollment. Finally, the application 110 provides visibility into device and app usage of the user of the computing device 300.

The application 110 supports a secure, lightweight tunnel between the computing device 300 and the cloud 120. For example, the lightweight tunnel can be HTTP-based. With the application 110, there is no requirement for PAC files, an IPSec VPN, authentication cookies, or user setup.

§ 5.0 Machine Learning in Network Security

Machine learning can be used in various applications, including malware detection, intrusion detection, threat classification, the user or content risk, detecting malicious clients or bots, detecting uncharacteristic user/device behavior, etc. In a particular use case, machine learning can be used to identify abnormal network behavior by monitoring network traffic. More particularly, models can be trained on historical user and device transactions that have been verified to be accurate for building baseline behavioral characteristics which can be used to identify abnormal behavior.

In the context of inline processing, sandboxing does a great job in detecting malicious files, but there is a cost in latency, which affects user experience. Machine learning can alleviate this issue by giving an earlier verdict on the static files. However, it requires ML to have extremely high precision, since the cost of a false positive and false negative are very high. For example, a benign hospital life-threatening file, if mistakenly blocked due to an ML model's wrong verdict, would cause a life disaster. Similarly, undetected ransomware could cause problems for an enterprise. Therefore, there is a need for a high-precision approach for both benign and malicious files.

Similarly, machine learning can determine a verdict in advance before a transaction reaches a destination. By training machine learning models with historic network traffic transactions, models can be trained to identify non-characteristic transactions performed by users or devices associated with the cloud 120.

The conventional approach to improve precision includes improving the probability threshold to increase precision. A p-value (probability value) is a statistical assessment for measuring the reliability of a prediction, but this does not identify the unreliability of predictions with high probabilities.

As described here, the typical machine learning training process collects millions of samples, extracts a set of features from these samples, and feeds the features into a machine learning model to determine patterns in the data. The output of this training process is a machine learning model that can predict various characteristics of the data, such as whether a file that has not been seen before is malicious or not, whether a transaction monitored via the cloud 120 is malicious or not, and the like.

It was determined that it is possible to match the production data with samples in the public repositories based on the unique identifiers. In this manner, the production data can be used while still maintaining strict data privacy. That is, the training data (or data used for generating synthetic data) is fully from the public repositories with the selection of the data in the public repositories based on the unique identifiers in the production data. Stated differently, the log data in storage includes the unique identifiers from the production data, but not the actual samples. It is possible to get the actual samples in the public repositories, thereby maintaining customer privacy.

§ 6.0 User/Network Profiles

The present disclosure describes systems and methods for creating user and network profiles and performing anomaly detection based thereon over a plurality of networks. Because the cloud 120 is adapted to act as and provide various security solutions, it has visibility into networks of customers as well as the endpoints from which traffic would be originating and terminating. Because of this, the cloud 120 can produce, based on historical transaction data (network traffic), baselines of normal traffic associated with endpoints, networks, and any combination thereof. Enabled by such baselines, and the ability of the cloud 120 to monitor customer traffic inline, the present systems are adapted to identify any abnormal traffic or any other traffic which does not fall within a threshold/baseline of a user, endpoint, network, etc. Alerts can be triggered when such abnormal traffic is identified, the alerts instructing security personnel associated with the customer to investigate. Abnormal traffic/network behavior refers to any activity or pattern of data transmission over a network that deviates significantly from the established norm or baseline of expected behavior. This can include a wide range of activities, such as unexpected spikes in traffic, unusual access patterns, the presence of unauthorized devices on the network, or the transmission of data to unusual external locations. Abnormal behavior can be indicative of various issues, including network problems, configuration errors, unauthorized access, or cybersecurity threats like malware infections, data breaches, and denial of service attacks.

Even further, the present systems contemplate utilizing the wide range of networks monitored by the cloud 120 for more accurate anomaly detection. Again, baseline traffic parameters can be learned by monitoring customer network traffic prior to facilitating the present abnormal traffic detection processes. Further, various machine learning models can be trained and used, which are adapted to perform the detection of abnormal traffic. These machine learning models can be trained with historical network traffic data in order to be able to identify anomalies.

As stated, the present systems can create baselines, i.e., behavioral baselines, for endpoints, entire networks, and groups of networks of associated with customers of the cloud 120. In various embodiments, this can be built and learned from the log data 130 as well as from real time traffic being monitored by the cloud 120. Once baselines are built, the cloud 120 is adapted to monitor traffic, as described for the various security solutions, for its plurality of customers. These profiles can be based on various parameters of the network traffic. These parameters can include typical times of day of traffic, number of days in a week when traffic is observed, peak traffic times, applications responsible for the traffic, nature of the traffic (i.e., protocol, category, etc.), destination information (i.e., public/private, geographical location, etc.), and frequency of traffic. Again, these parameters are observed and used to build baseline profiles for endpoints, networks, etc.

Figure 5:
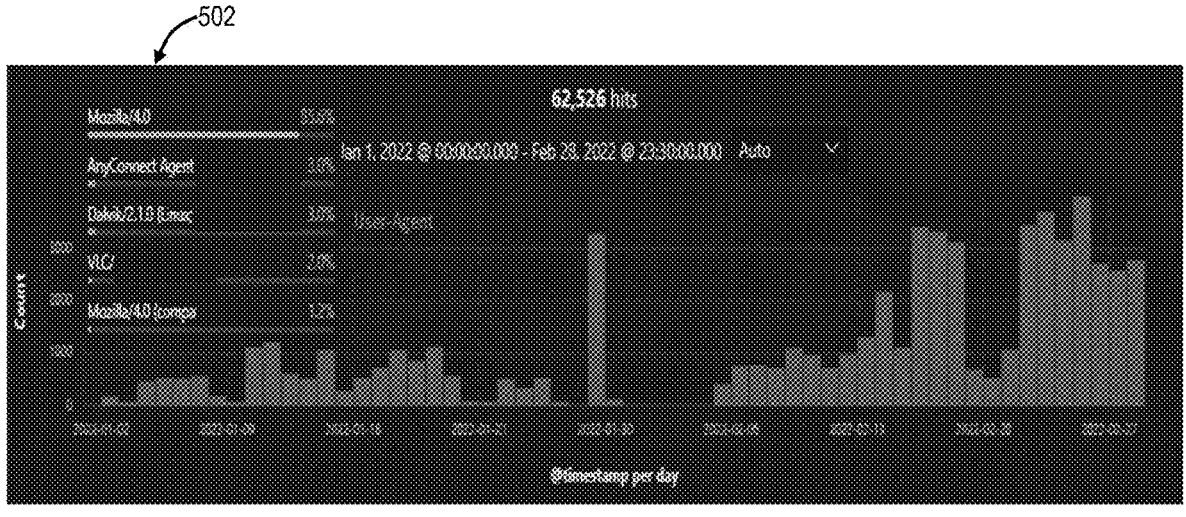
FIG. 5-FIG. 11 are graphical representations of an endpoints observed traffic patterns.

As an example, an endpoint's traffic patterns are observed over a period of time. FIG. 5-FIG. 11 are graphical representations of an endpoints observed traffic patterns. FIG. 5 is the observed traffic of the endpoint over a period, for example, over a period of a month. The graphical representations shown in FIG. 5-FIG. 11 provide information related to only one parameter (user agent), although it will be appreciated that the present systems can utilize a plurality of parameters for building baseline traffic profiles. In this example, for simplicity purposes, the user agent parameter is used. That is, the systems determine that traffic from the endpoint originates from the 5 user agents 502 (applications) shown in the graphical representation. In this example, these user agents 502 are browser applications. The graphical representation shown in FIG. 5 shows the amount of traffic originating from the endpoint via the various user agents 502 over a time span.

Figure 6:
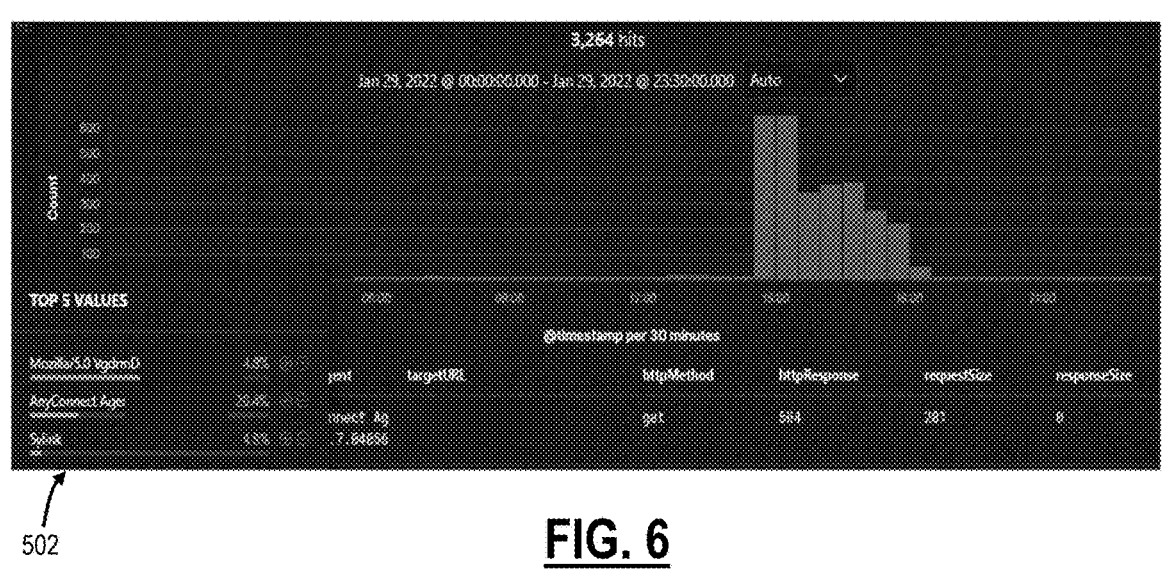

FIG. 6 is a graphical representation of traffic originating from the endpoint via the various user agents 502 over a day within the time span of FIG. 5. From this graph, it can be seen that traffic from this particular endpoint surges between the hours of 3 pm and 6 pm, and for the rest of the day, the traffic is insignificant. Thereby, the user of this endpoint must be active between the hours of 3 pm and 6 pm. Also, the traffic for this day originated from only 3 user agents 502.

Figure 7:
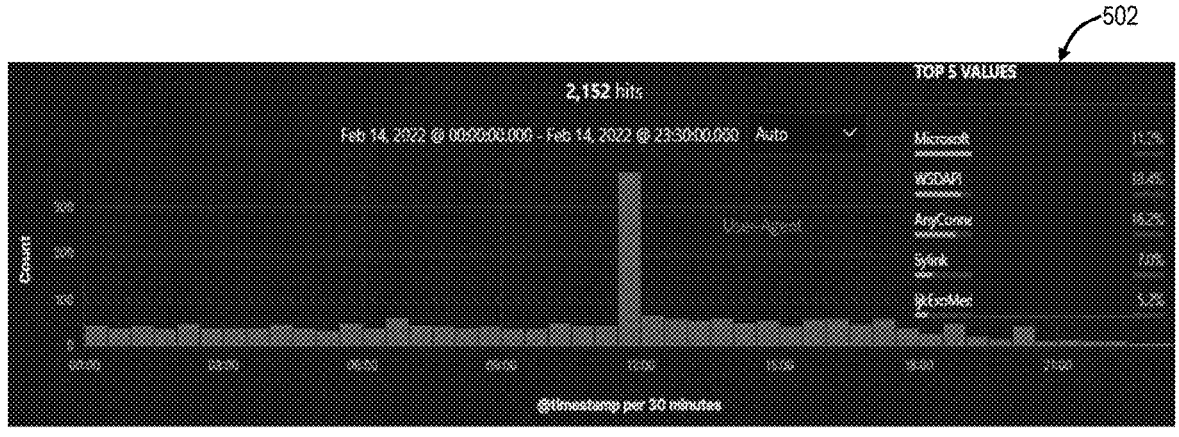

FIG. 7 is a graphical representation of traffic originating from the endpoint via the various user agents 502 over another day within the time span of FIG. 5. From this graph, a spike of traffic is observed at 12 pm with increased traffic throughout the day when compared to the day represented in FIG. 6. Also, 2 additional user agents 502 are identified.

Figure 8:
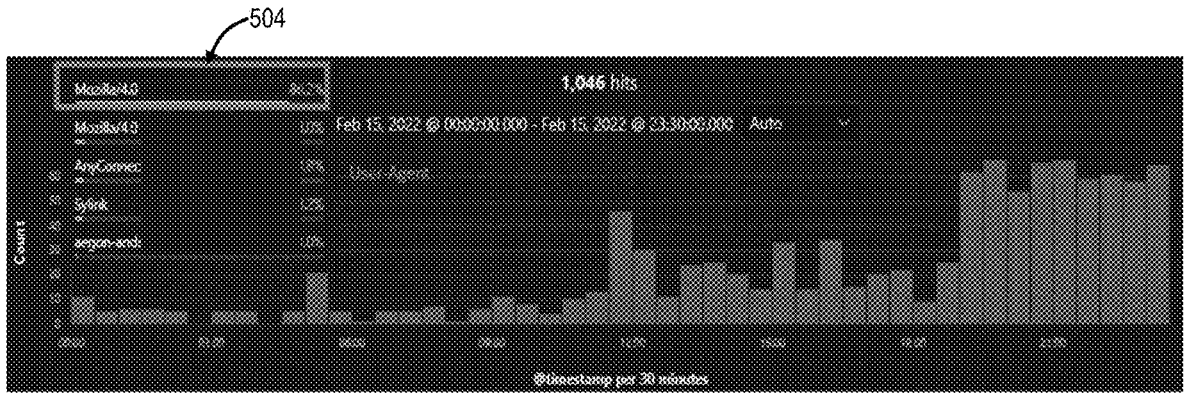

FIG. 8 is a graphical representation of traffic originating from the endpoint via the various user agents 502 over another day within the time span of FIG. 5. Within the day represented in FIG. 8, a huge increase in traffic is observed for the endpoint. This increase in traffic is even observed after 6 pm, which is out of the ordinary for this endpoint. Additionally, a new user agent 504 is identified which contributes to 86.2% of the traffic originating from this endpoint. That is, the systems are adapted to determine a percentage of traffic originating from each of the user agents 502.

Figure 9:
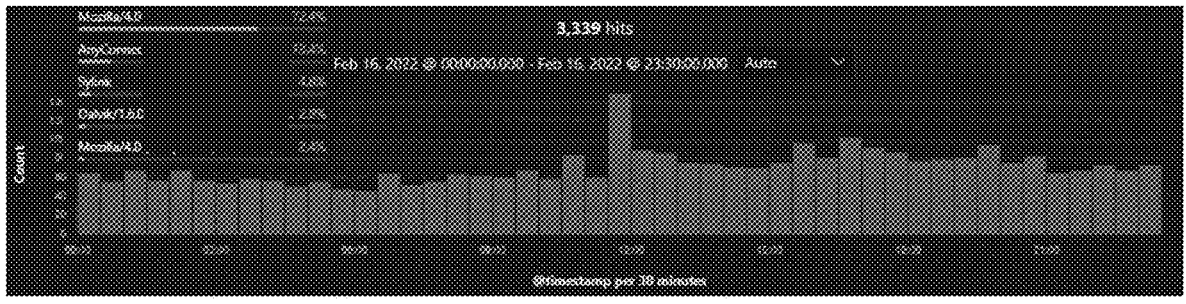
Figure 10:
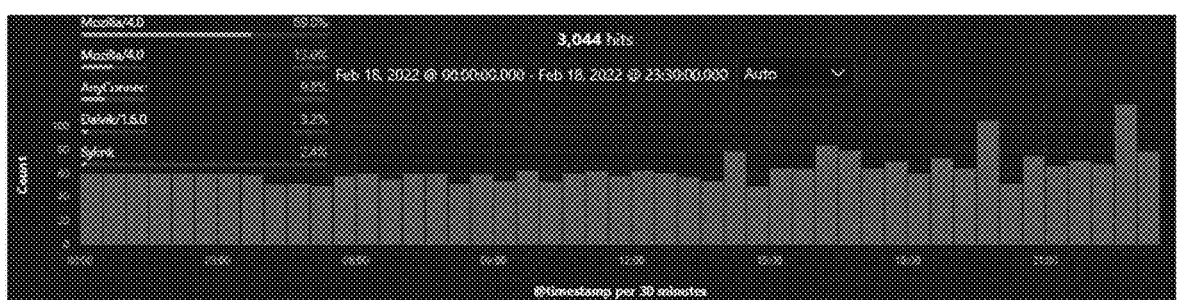
Figure 11:
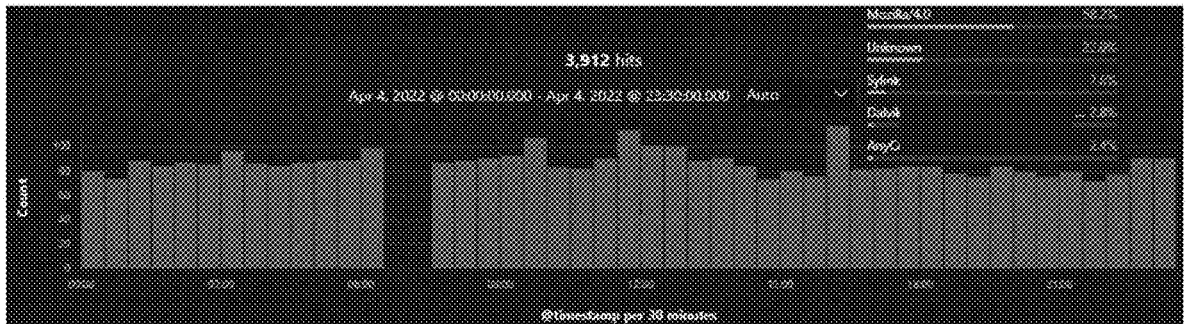

FIG. 9 is a graphical representation of traffic originating from the endpoint via the various user agents 502 over another day within the time span of FIG. 5. From this graph, a huge amount of traffic is observed from the endpoint throughout the entire day, wherein 72.4% of the traffic is originating from a single user agent 502. Before this day, the systems observed activity within particular time periods, for example, between 3 pm and 6 pm. Now, the endpoint is producing a much larger amount of traffic throughout the entire day from a specific user agent 502. A similar trend is observed over subsequent days shown in FIG. 10 and FIG. 11. Also observed over the day shown in FIG. 11 is a window where traffic was not observed. This window of no traffic can be the result of the endpoint being shut down, restarted, or being disconnected from the network. Again, the increase in traffic is observed to be originating from a specific user agent, in this example, "Mozilla/4.0".

Figure 12:
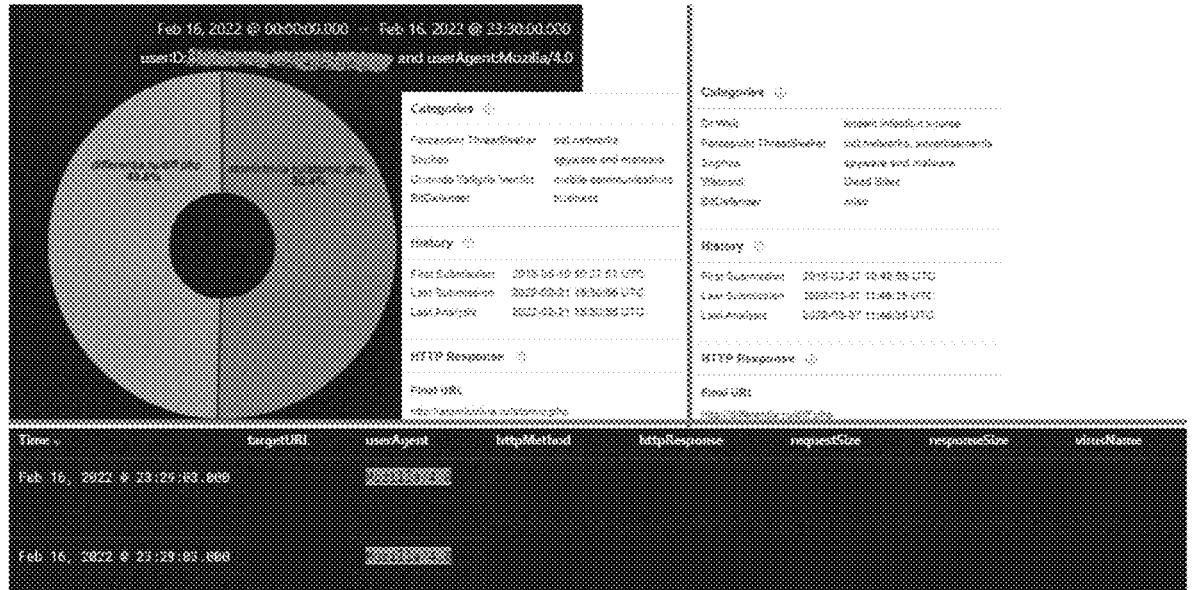
FIG. 12 is an example display showing a distribution of destination Uniform Resource Locators (URLs).

By monitoring the traffic of the endpoint over the period of time, various conclusions can be identified. FIG. 12 is an example display showing a distribution between Uniform Resource Locators (URLs) which make up the destinations of the traffic observed from the endpoint. In the present example, it is observed that all of the traffic originating from the "Mozilla/4.0" user agent on the endpoint is to 2 URLs. The systems can identify these URLs and determine if they are related to a threat. In this example, both of the URLs are related to a threat, and an alert can be raised.

Again, the example described herein is based on a single parameter (user agent) for simplicity. It will be appreciated that the present systems can utilize any number of parameters to build baselines and identify anomalies for producing alerts. Also, the present examples are associated with a single endpoint for simplicity. It will be appreciated that the present systems can create baselines for entire networks, groups of networks, and the like by observing traffic from all endpoints associated with a network or group of networks.

§ 6.1 Anomaly Detection Based on Endpoint/Network Profiles

Figure 13:
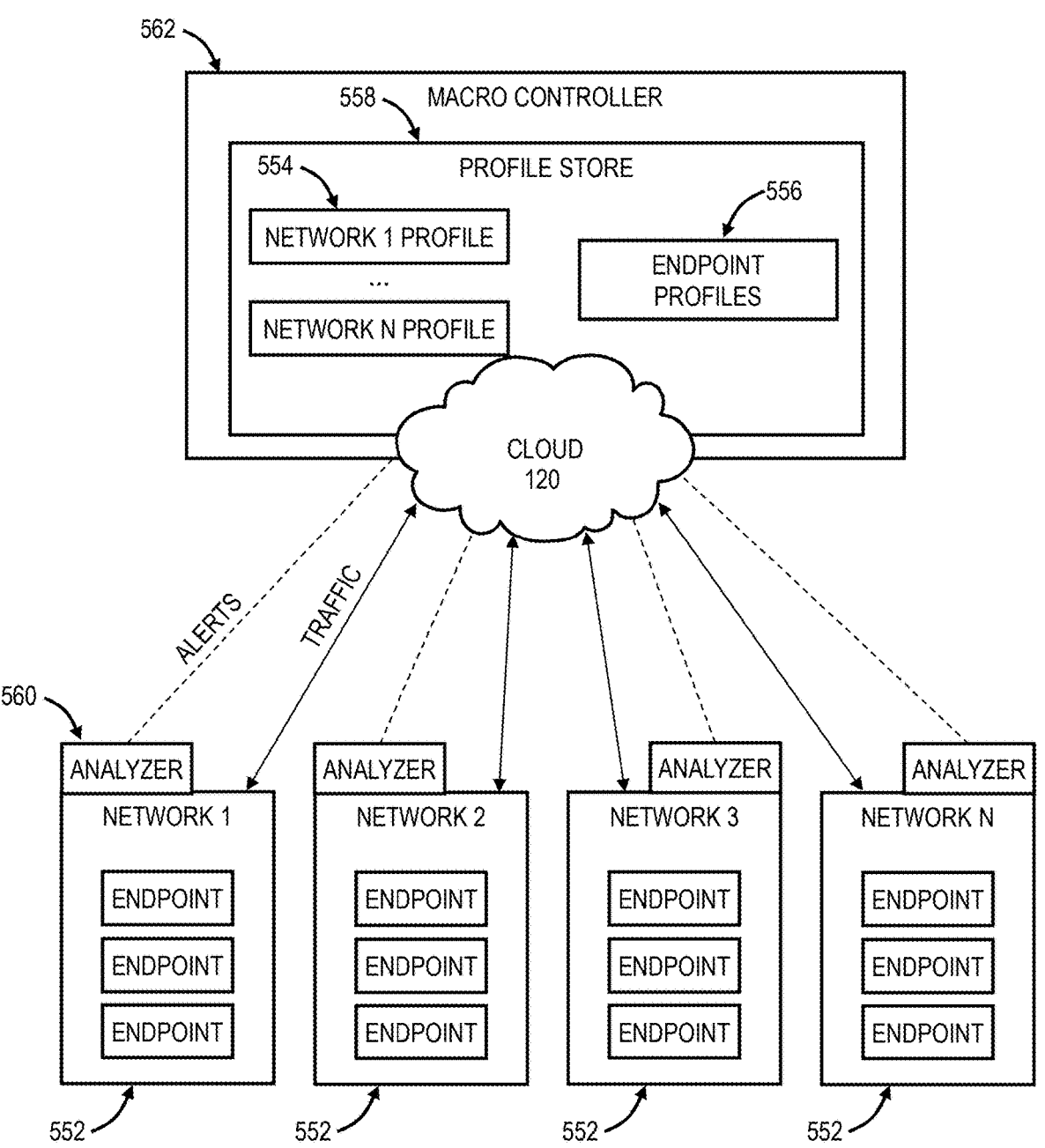
FIG. 13 is a flow diagram of an endpoint/network profile based anomaly detection architecture.

In addition to creating baseline profiles for user/network traffic characteristics, the present systems present an anomaly detection architecture. FIG. 13 is a flow diagram of an endpoint/network profile based anomaly detection architecture. In various embodiments, the cloud 120 is adapted to monitor user traffic, network traffic, etc. inline. Each of the networks 552 can be associated with a customer of the cloud 120, or separate customers of the cloud 120. As described, the systems are adapted to create network profiles 554 and/or endpoint profiles 556 (traffic profiles) based on observing traffic originating from the networks 552, each having endpoints executing thereon. That is, the systems are adapted to create a network profile 554 for each network 552 associated with the cloud 120, and, in various embodiments, an endpoint profile 556 for each endpoint of the networks 552. In various embodiments, each of the networks 552 can be associated with a single customer or a plurality of customers. In cases where the networks 552 are associated with a plurality of customers, data is not shared between networks.

In various embodiments, all of these profiles are stored within a profile store 558 within the cloud 120 or other location, such as various analyzers of each network (further described herein). Based on this, and the inline monitoring capabilities of the cloud 120, the present systems can detect any abnormal behavior of an endpoint or network by utilizing the various profiles (554, 556). In various embodiments, the endpoint profiles 556 and network profiles 554 can be continuously updated based on specific time intervals. For example, the various profiles can be updated each month based on a previous month's traffic patterns as and when deviation in any of the networks traffic is observed, i.e., by its specific analyzer or macro controller. Otherwise, the profiles can be revisited periodically as well as if fine tuning is necessary based on intelligence gathered. Such "retraining" of models and updating profiles can increase the systems ability to detect anomalies. Additionally, the systems can continuously update profiles based on findings, such as when an anomaly is identified as normal.

A key aspect of the present anomaly detection architecture is the ability of the cloud 120 to monitor and process data from a plurality of networks 552. That is, the cloud 120 can utilize this capability to more accurately determine if a perturbation in a networks traffic characteristics is the result of something malicious, or a routine process. In various embodiments, each network can be configured with an analyzer 560, wherein the analyzer 560 is adapted to identify any anomalies based on the various profiles, thus enabling closer and more detailed inspection of network specific traffic. In such embodiments, the network profile 554 and various endpoint profiles 556 associated with the analyzers network can be stored at the analyzer for use thereof. That is, in various embodiments, the analyzer 560 of a network is adapted to alert the cloud 120 of any anomalies observed in the traffic. In this architecture, the cloud-based system 100 can be contemplated as a macro controller to which each of the various analyzers report to. In various embodiments, the macro controller 562 can be a specific module configured for ingesting alerts from each of the analyzers and adapted to determine if an anomaly that suggests malicious intent has occurred. That is, the macro controller 562 is adapted to monitor traffic for anomalies at a broader level than the plurality of analyzers 560 associated with each network. Further, the macro controller 562 is adapted to engage in communication with each of the networks 552 to gather information (validation) about an abnormality reported from a specific analyzer 560. The macro controller 562 is also adapted to alert the various analyzers 560 to be vigilant about similar traffic that has been flagged as malicious. That is, responsive to determining that an occurrence of abnormal traffic is malicious, the macro controller 562 can alert the individual analyzers 560 to look for similar traffic. This is because similar traffic may also be malicious in nature.

For example, on a particular day, uncommon traffic may be observed originating from a network 552. Based on the present systems detecting such an anomaly, an alert is raised by the analyzer 560 of the network 552 and relayed to the macro controller 562. The analyzer 560 can provide the traffic in question to the macro controller 562 along with any relevant parameters, where the macro controller 562 is further configured to determine if the anomaly is malicious or caused by a non-malicious process, i.e., is legitimate. Responsive to receiving an alert indicating anomalous traffic from an analyzer 560 of a network 552, the macro controller 562 can check the other network profiles 554 and traffic of other networks 552 to see if such traffic has been seen. In addition, the macro controller 562 can check if other analyzers 560 of other networks 552 have risen such alerts associated with such traffic. If the macro controller 562 does not find any matching traffic in either the profiles, traffic, or from any other analyzers, it can relay this information to the specific analyzer 560 of the network 552, where the analyzer 560 can perform an action. Similarly, the macro controller 562 can perform an action responsive to receiving an alert associated with uncommon traffic to which there is no match in another network. The action performed can be any of allowing the traffic, blocking the traffic, alerting administrators of the network, recommending remedial actions, etc. Additionally, the macro controller 562 can provide the anomalous traffic to various security services of the cloud 120 for identifying the traffic as malicious or legitimate. That is, in some embodiments, the traffic may not be labeled as malicious just because no other similar traffic has been seen across the various networks, and further investigation may be necessary.

In a specific use case, the present systems can be used to, responsive to detecting abnormal traffic, determining that the abnormal traffic is not malicious. For example, suppose the various networks (network 1-network N) are in different regions such as Asia, United States, Europe, etc. Each of these networks can have devices which are configured for automatic updates to some software, and these devices may be turned off when not in use. Because of this, when a software update is released, devices of one network may begin to perform the update while devices associated with other networks may not. In this case, the network which is experiencing the traffic associated with the update may identify this as abnormal and send an alert to the macro controller 562. Responsive to this, the macro controller 562 can determine if any of the other networks have experienced this abnormal traffic, and if so, this information can be relayed back to the analyzer 560 of the network 552 which raised the alert.

In addition to checking abnormal traffic behaviors between a plurality of networks to determine if such traffic has been seen before, the macro controller 562 can be adapted to check the various parameters of the traffic to further determine the legitimacy of the abnormal traffic. For example, in the previous use case, the macro controller 562 can determine the source and destination of the traffic (i.e., a specific user agent or server) and make a determination based thereon. For example, if the origin of the traffic is a server known to be legitimate, and the nature of the traffic is recognized as being related to periodic/out-of-band updates, the traffic is most likely legitimate even if it is considered abnormal, again this legitimacy can be determined by the specific analyzer 560 and/or the macro controller 562. This validation information can be passed onto other network profiles through a feedback mechanism so that the alerts are proactively identified and resolved automatically. Similarly, for example, if the software update is from a Microsoft service, the macro controller 562/cloud 120 can identify the originator as Microsoft and based on the originator being on an allow list, the macro controller 562 can determine that the abnormal traffic is not malicious. Similarly, the macro controller 562 may determine that a source or destination is known to be malicious, thus, the macro controller 562 can identify the abnormal traffic as malicious and relay the information to the analyzer and perform an action based thereon. Thus, the present systems can make a determination based on whether other networks have experienced such traffic and whether parameters of the traffic indicate that it may be malicious.

In another use case, suppose a network is infected and is generating traffic to a server in a country which is considered a threat. This can be caused by an infected device/endpoint within the network. Again, the profile for this network is built based on historic traffic of the network and its endpoints over a period of time. If, within that period of time, no traffic was sent to a server in that country, the systems will identify the traffic being sent to this country as an anomaly. Based on detecting such an anomaly, the analyzer 560 of the network 552 which is observing the traffic can provide an alert to the macro controller 562 along with various parameters of the traffic. Again, the analyzer 560 can determine if the traffic is an anomaly based on these parameters which can include the time of day of traffic, number of days in a week when traffic is typically observed, peak traffic times, applications responsible for the traffic, nature of the traffic (protocol, category, etc.), destination information (public/ private, geographical location, etc.), and frequency of traffic, etc.

The macro controller 562 can further determine if the user agent associated with the traffic is suspicious, if the time of day of the traffic is suspicious, if the destination of the traffic is suspicious, etc. Again, these parameters can be checked by various security services to make the determination as to whether the anomalous traffic is malicious. The profiles define baselines for the various parameters, thus, they can be used to validate legitimacy of traffic in addition to being used to detect an anomaly.

In another use case, suppose a node or device in a network is suddenly observed to be generating a large volume of traffic to a particular or multiple destinations. This behavior is considered an anomaly because the device type may indicate it to be an IoT device and such volume of traffic is highly unlikely from an IoT device. The destination or destinations of the traffic can also be inspected and can further indicate malicious intent of the anomalous traffic. For example, the traffic may be to servers known to have malicious intent.

In addition to network and device profiles, the present systems are adapted to create various types of profiles including generalized profiles for devices and networks, organization specific profiles, and the like. These profiles are used in cases where a new device, or a new network is added. For example, if a new device is added to a network, the systems can associate the new device with the generalized device profile for that type of device. Similarly, if a new network is added to the plurality of networks, the systems can associate the new network with a generalized network profile. For new devices and networks, once traffic has been observed from therefrom, the profiles associated therewith can be fine tuned to better fit the behaviors of those new devices/networks.

Again, based on the analyzer 560 of a network detecting an anomaly and sending an alert to the macro controller 562, the macro controller 562 can determine if any of the other networks have seen similar traffic. If no other networks have similar traffic, the systems can determine that the abnormal traffic is in fact an anomaly that may be malicious. Again, further investigation can be performed by the cloud 120 to determine if the abnormal traffic is malicious or not. In the present disclosure, the term "similar traffic" can correspond to traffic having the same or similar parameters, or any of the profiles of the other networks showing such traffic as being normal. That is, the determination as to whether the anomalous traffic is normal or not can be made based on whether other networks have had or are having traffic/transactions with the same or similar parameters.

In various embodiments, the detecting of abnormal traffic at an endpoint can be performed by the application 110 as described herein. The application 110 executing on an endpoint can persist a profile for that endpoint. Responsive to the application 110 detecting abnormal traffic based on the endpoint profile, the application 110 can provide an alert as described herein to the cloud 120, macro controller 562, specific analyzer 560 associated with its network, an enforcement node of the network, etc. for the systems to further investigate. Again, this investigation can include determining if other endpoints within the network have exhibited such traffic.

Figure 14:
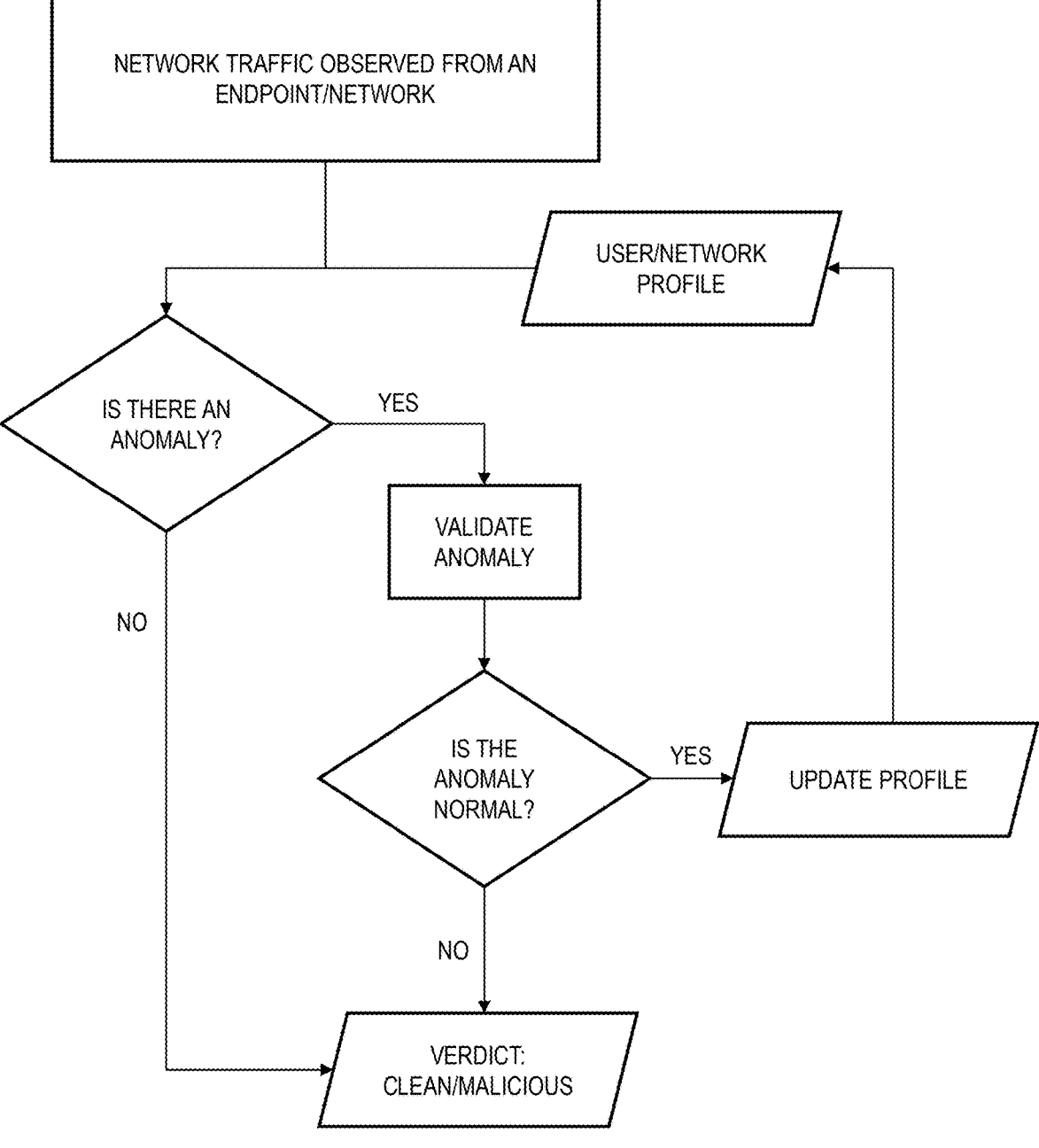
FIG. 14 is a flow diagram of the present endpoint Vnetwork profile based anomaly detection process.

FIG. 14 is a flow diagram of the present endpoint/network profile based anomaly detection process. Again, the present systems are adapted to observe traffic originating from endpoints and networks. Based on the various user/network profiles, the systems can detect any deviation from baseline traffic parameters associated with endpoints and/or networks as a whole. If an anomaly is detected, the present systems can validate the anomaly by comparing the traffic identified as the anomaly with traffic of other networks. If similar traffic which has been validated as legitimate is found in other networks or other endpoints, the anomaly can be considered "normal" and the profile for that specific network or endpoint can be updated to reflect that such traffic is normal. If no similar traffic is found, the systems can inspect the traffic further via the various security services offered by the cloud to determine if the anomalous traffic is clean or malicious. Based on the result of the inspection, the cloud can perform an action such as blocking the traffic, allowing the traffic, alerting a user of the network or endpoint, etc.

Similarly, as described, profiles can be generated for endpoints as well as networks as a whole. That is, the systems can perform the steps described herein at the device level. For example, if traffic from a device is identified as an anomaly based on the various parameters and baseline of the device, the systems can search to see if similar traffic has been observed from other devices in the same network or other networks.

In various embodiments, alerts can be raised by an analyzer based on a plurality of reasons. These reasons can include, but are not limited to, high volume of data transfer from a network, device, etc., data transfer observed at unusual times of the day based on device profiles, network profiles, etc., data transfer observed from/to an unexpected server, direction of data transfer, i.e., inside-out or outside-in, and the like as described herein.

Further, the macro controller 562 can provide insight and recommendations to networks based on attacks observed from other networks. That is, the macro controller 562 can warn administrators of a network that they may have a vulnerability to an attack that was attempted on another network. This is because the macro controller 562 has visibility into the devices and products used by the networks, the products being the security products currently in use. The macro controller 562 or cloud 120 can provide recommendations based thereon, including checking if all devices on the network have software that is up to date, if proper data sanitization is taking place, etc. the systems can further recommend various security products offered by the cloud 120 to protect the network based on attack attempts detected on other networks.

§ 6.2 Process for Anomaly Detection Based on User/Network Profiles

Figure 15:
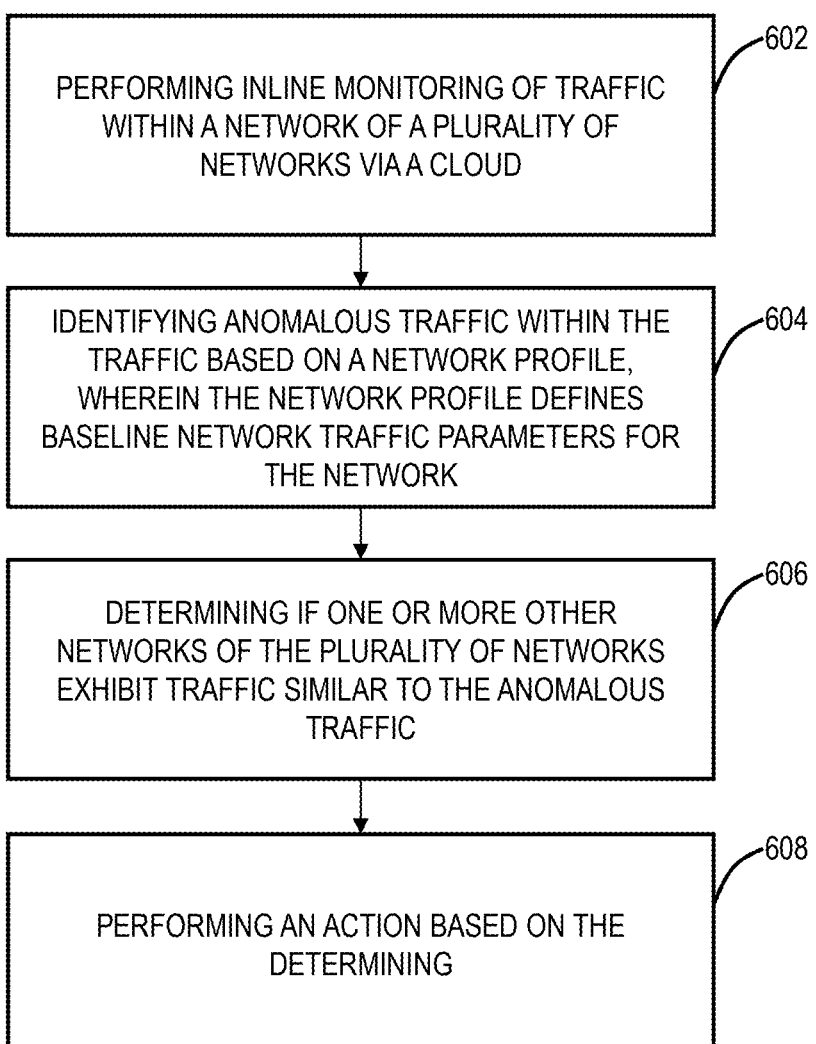
FIG. 15 is a flow chart of a process for endpoint/network profile based anomaly detection.

FIG. 15 is a flow chart of a process 600 for endpoint/network profile based anomaly detection. The process 600 includes performing inline monitoring of traffic within a network of a plurality of networks via a cloud (step 602); identifying anomalous traffic within the traffic based on a network profile, wherein the network profile defines baseline network traffic parameters for the network (step 604); determining if one or more other networks of the plurality of networks exhibit traffic similar to the anomalous traffic (step 606); and performing an action based on the determining (step 608).

The process 600 can further include allowing the traffic, blocking the traffic, and alerting a user of the network. The identifying can be performed by an analyzer associated with the network, wherein the determining is performed by the cloud. The steps can further include responsive to the analyzer identifying anomalous traffic within the network, receiving an alert for the anomalous traffic; responsive to receiving the alert, determining if the one or more other networks of the plurality of networks exhibit traffic similar to the anomalous traffic. The alert can include one or more parameters associated with the anomalous traffic. The network profile can include parameters defining baseline characteristics of the network, wherein identifying anomalous traffic includes detecting parameters within the traffic which fall outside of the baseline characteristics of the network. The determining can include determining that one or more other networks of the plurality of networks exhibit traffic similar to the anomalous traffic, wherein the action includes allowing the traffic based thereon. The one or more other networks of the plurality of networks can belong to any of a same customer associated with the network and one or more different customers. The steps can further include updating the network profile based on determining that one or more other networks of the plurality of networks exhibit traffic similar to the anomalous traffic. The determining can include determining that one or more other networks of the plurality of networks do not exhibit traffic similar to the anomalous traffic, wherein the steps further include performing an inspection of the anomalous traffic to determine if the anomalous traffic is malicious.

§ 7.0 Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A method comprising steps of:
performing, by a cloud-based security service operating as an inline overlay between endpoints of the network and an external network, inline monitoring of traffic within a network of a plurality of networks via a cloud;
storing, for each respective network of the plurality of networks, a corresponding network profile that defines baseline network traffic parameters for the respective network;
identifying anomalous traffic within the traffic based on a network profile, wherein the network profile defines baseline network traffic parameters for the network and wherein the identifying is performed by an analyzer associated with the network;
responsive to identifying the anomalous traffic, transmitting, by the analyzer to the cloud, an alert that includes one or more parameter ted with the anomalous traffic;
determining, responsive to receiving the alert, by a macro controller of the cloud, if one or more other networks of the plurality of networks exhibit traffic similar to the anomalous traffic by comparing the one or more parameters associated with the anomalous traffic to (i) one or more network profiles corresponding to the one or more other networks and (ii) one or more ale received from analyzers associated with the one or more other networks; and performing an action based on the determining, wherein the action includes any of allowing the traffic, blocking the traffic, and alerting a user of the network and wherein the action is performed by the analyzer or the cloud-based security service.

2. The method of claim 1, wherein determining whether the one or more other networks exhibit traffic similar to the anomalous traffic comprises determining whether the one or more parameters match corresponding parameters in the one or more network profiles of the one or more other networks or in one or more alerts previously received from analyzers associated with the one or more other networks.

3. The method of claim 1, wherein the identifying is performed by an analyzer associated with the network, and wherein the determining is performed by the cloud.

4. The method of claim 3, wherein the steps further comprise:

responsive to the analyzer identifying anomalous traffic within the network, receiving an alert for the anomalous traffic; and responsive to receiving the alert, determining if the one or more other networks of the plurality of networks exhibit traffic similar to the anomalous traffic.

5. The method of claim 4, wherein the alert includes one or more parameters associated with the anomalous traffic.

6. The method of claim 1, wherein the network profile includes parameters defining baseline characteristics of the network, and wherein identifying anomalous traffic includes detecting parameters within the traffic which fall outside of the baseline characteristics of the network.

7. The method of claim 1, wherein the determining includes determining that one or more other networks of the plurality of networks exhibit traffic similar to the anomalous traffic, and wherein the action includes allowing the traffic based thereon.

8. The method of claim 7, wherein the one or more other networks of the plurality of networks belong to any of a same customer associated with the network and one or more different customers.

9. The method of claim 7, wherein the steps further comprise:

updating the network profile based on determining that one or more other networks of the plurality of networks exhibit traffic similar to the anomalous traffic.

10. The method of claim 1, wherein the determining includes determining that one or more other networks of the plurality of networks do not exhibit traffic similar to the anomalous traffic, and wherein the steps further comprise:

performing an inspection of the anomalous traffic to determine if the anomalous traffic is malicious.

11. A non-transitory computer-readable medium comprising instructions that, when executed, cause one or more processors to perform steps of:

performing, by a cloud-based security service operating as an inline overlay between endpoints of the network and an external network, inline monitoring of traffic within a network of a plurality of networks via a cloud;

storing, for each respective network of the plurality of networks, a corresponding network profile that defines baseline network traffic parameters for the respective network;

identifying anomalous traffic within the traffic based on a network profile, wherein the network profile defines baseline network traffic parameters for the network and wherein the identifying is performed by an analyzer associated with the network;

responsive to identifying the anomalous traffic, transmitting, by the analyzer to the cloud, an alert that includes one or more associated with the anomalous traffic;

determining, responsive to receiving the alert, by a macro controller of the cloud, if one or more other networks of the plurality of networks exhibit traffic similar to the anomalous traffic by comparing the one or more parameters associated with the anomalous traffic to (i) one or more network profiles corresponding to the one or more other networks and (ii) one or more alerts received from analyzers associated with the one or more other networks; and performing an action based on the determining, wherein the action includes any of allowing the traffic, blocking the traffic, and alerting a user of the network and wherein the action is performed by the analyzer or the cloud-based security service.

12. The non-transitory computer-readable medium of claim 11, wherein determining whether the one or more other networks exhibit traffic similar to the anomalous traffic comprises determining whether the one or more parameters match corresponding parameters in the one or more network profiles of the one or more other networks or in one or more alerts previously received from analyzers associated with the one or more other networks.

13. The non-transitory computer-readable medium of claim 11, wherein the identifying is performed by an analyzer associated with the network, and wherein the determining is performed by the cloud.

14. The non-transitory computer-readable medium of claim 13, wherein the steps further comprise:

responsive to the analyzer identifying anomalous traffic within the network, receiving an alert for the anomalous traffic; and responsive to receiving the alert, determining if the one or more other networks of the plurality of networks exhibit traffic similar to the anomalous traffic.

15. The non-transitory computer-readable medium of claim 14, wherein the alert includes one or more parameters associated with the anomalous traffic.

16. The non-transitory computer-readable medium of claim 11, wherein the network profile includes parameters defining baseline characteristics of the network, and wherein identifying anomalous traffic includes detecting parameters within the traffic which fall outside of the baseline characteristics of the network.

17. The non-transitory computer-readable medium of claim 11, wherein the determining includes determining that one or more other networks of the plurality of networks exhibit traffic similar to the anomalous traffic, and wherein the action includes allowing the traffic based thereon.

18. The non-transitory computer-readable medium of claim 17, wherein the one or more other networks of the plurality of networks belong to any of a same customer associated with the network and one or more different customers.

19. The non-transitory computer-readable medium of claim 17, wherein the steps further comprise:

updating the network profile based on determining that one or more other networks of the plurality of networks exhibit traffic similar to the anomalous traffic.

20. The non-transitory computer-readable medium of claim 11, wherein the determining includes determining that one or more other networks of the plurality of networks do not exhibit traffic similar to the anomalous traffic, and wherein the steps further comprise:

performing an inspection of the anomalous traffic to determine if the anomalous traffic is malicious.

* * * * *